US012614323B2

(12) United States Patent
Brdiczka et al.

(10) Patent No.: US 12,614,323 B2
(45) Date of Patent: Apr. 28, 2026

(54) TARGET SCENE COMPOSITION USING GENERATIVE AI

(71) Applicant: Adobe Inc., San Jose, CA (US)

(72) Inventors: Oliver Brdiczka, San Jose, CA (US);
Ion Rosca, San Jose, CA (US);
Aliakbar Darabi, San Jose, CA (US);
Alexandru Vasile Costin, San Jose, CA
(US); Alexandru Chiculita, San Jose,
CA (US)

(73) Assignee: Adobe Inc., San Jose, CA (US)

( * ) Notice: Subject to any disclaimer, the term of this
patent is extended or adjusted under 35
U.S.C. 154(b) by 241 days.

(21) Appl. No.: 18/322,073

(22) Filed: May 23, 2023

(65) Prior Publication Data

US 2024/0127511 A1     Apr. 18, 2024

Related U.S. Application Data

(60) Provisional application No. 63/416,882, filed on Oct.
17, 2022.

(51) Int. Cl.
*G06T 1/00*        (2006.01)
*G06F 40/30*      (2020.01)
*G06T 11/60*      (2006.01)

(52) U.S. Cl.
CPC .............. *G06T 11/60* (2013.01); *G06F 40/30*
(2020.01)

(58) Field of Classification Search
CPC ..... G06T 15/005; G06T 19/00; G06T 11/001;
G06T 11/40; G06T 11/60; G06F 40/30;
G06F 40/56
USPC ........................................................ 345/418
See application file for complete search history.

(56) References Cited

U.S. PATENT DOCUMENTS

| | | | |
|---|---|---|---|
| 6,091,505 A | 7/2000 | Beaman et al. | |
| 9,473,904 B2 | 10/2016 | Bennett | |
| 10,074,200 B1 * | 9/2018 | Yeturu ................... | G06F 40/169 |
| 10,693,981 B2 | 6/2020 | Galai et al. | |
| 10,713,821 B1 * | 7/2020 | Surya ...................... | G06N 3/045 |
| 10,922,718 B2 | 2/2021 | Hong et al. | |
| 11,537,765 B1 | 12/2022 | Jacobs et al. | |
| 2002/0101450 A1 | 8/2002 | Magendanz et al. | |

(Continued)

FOREIGN PATENT DOCUMENTS

KR      10-2021-0025856 A      3/2021

OTHER PUBLICATIONS

Office Action , GB App. No. 2312477.9, Feb. 23, 2024, 7 pages.

(Continued)

*Primary Examiner* — Gordon G Liu
(74) *Attorney, Agent, or Firm* — Nicholson De Vos
Webster & Elliott LLP

(57)      ABSTRACT

A method includes receiving a natural language description
of an image to be generated using a machine learning model.
The method further includes extracting, from the natural
language description of the image to be generated, a control
element and a sub-prompt. The method further includes
identifying a relationship between the control element and
the sub-prompt based on the natural language description of
the image to be generated. The method further includes
generating, by the machine learning model, an image based
on the control element, the sub-prompt, and the relationship.
The image includes visual elements corresponding to the
control element and the sub-prompt.

20 Claims, 11 Drawing Sheets

(56) References Cited

U.S. PATENT DOCUMENTS

| | | | |
|---|---|---|---|
| 2004/0039796 A1 | 2/2004 | Watkins | |
| 2008/0208379 A1 | 8/2008 | Weel | |
| 2008/0304807 A1 | 12/2008 | Johnson et al. | |
| 2010/0161729 A1 | 6/2010 | Leblanc et al. | |
| 2012/0231774 A1 | 9/2012 | Blades | |
| 2018/0300294 A1 | 10/2018 | Dhanuka et al. | |
| 2019/0114661 A1 | 4/2019 | Bennion et al. | |
| 2019/0251721 A1* | 8/2019 | Hua | G06N 3/088 |
| 2020/0272689 A1 | 8/2020 | Kumawat et al. | |
| 2021/0042381 A1 | 2/2021 | Kumawat et al. | |
| 2021/0044674 A1 | 2/2021 | Govan et al. | |
| 2021/0073323 A1 | 3/2021 | Fisher et al. | |
| 2021/0166013 A1 | 6/2021 | Tensmeyer et al. | |
| 2021/0200824 A1 | 7/2021 | Kim et al. | |
| 2022/0108417 A1* | 4/2022 | Liu | G06T 1/0007 |
| 2022/0129618 A1 | 4/2022 | Sawaf et al. | |
| 2022/0229865 A1 | 7/2022 | Mccarty et al. | |
| 2022/0357914 A1* | 11/2022 | Krishnamurthy | G06F 3/011 |
| 2023/0281691 A1 | 9/2023 | Buzzell et al. | |
| 2025/0061623 A1 | 2/2025 | Liu et al. | |
| 2025/0077761 A1 | 3/2025 | Liu et al. | |
| 2025/0191398 A1 | 6/2025 | Liu et al. | |

OTHER PUBLICATIONS

Office Action, GB App. No. P11746-GB, Feb. 5, 2024, 06 pages of Original Document only.

Non-Final Office Action, U.S. Appl. No. 18/306,048, Nov. 20, 2024, 19 pages.

Non-Final Office Action, U.S. Appl. No. 18/318,567, May 2, 2025, 48 pages.

Final Office Action, U.S. Appl. No. 18/306,048, Jun. 10, 2025, 23 pages.

Final Office Action, U.S. Appl. No. 18/318,567, Oct. 14, 2025, 58 pages.

Non-Final Office Action, U.S. Appl. No. 18/306,048, Oct. 1, 2025, 25 pages.

* cited by examiner

1000

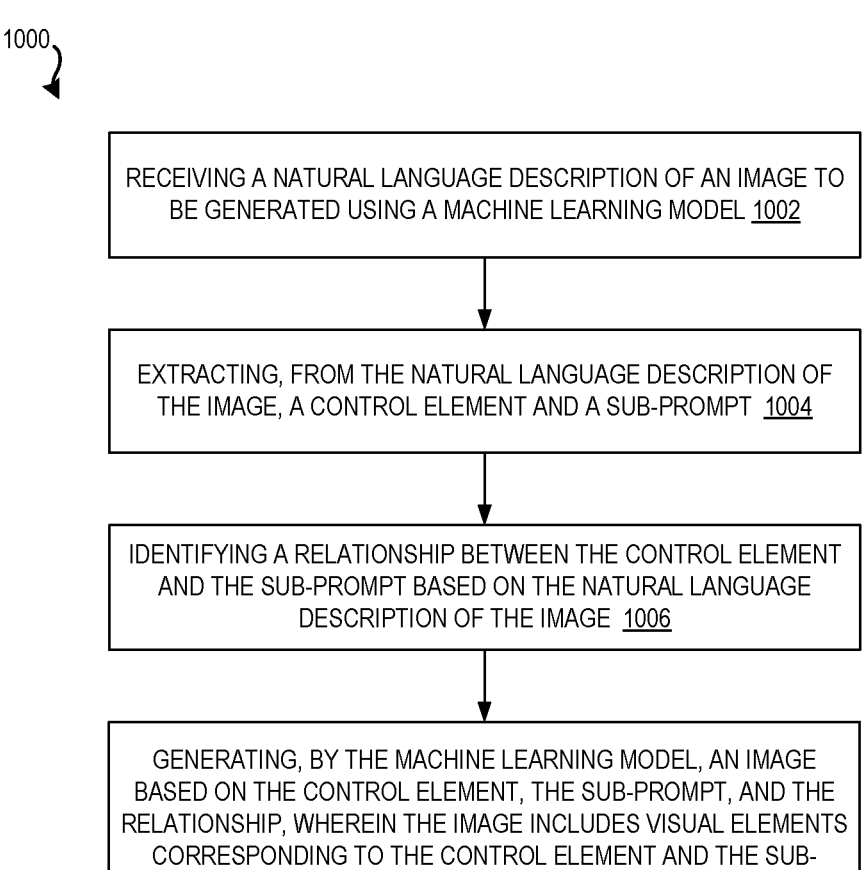

RECEIVING A NATURAL LANGUAGE DESCRIPTION OF AN IMAGE TO BE GENERATED USING A MACHINE LEARNING MODEL 1002

EXTRACTING, FROM THE NATURAL LANGUAGE DESCRIPTION OF THE IMAGE, A CONTROL ELEMENT AND A SUB-PROMPT 1004

IDENTIFYING A RELATIONSHIP BETWEEN THE CONTROL ELEMENT AND THE SUB-PROMPT BASED ON THE NATURAL LANGUAGE DESCRIPTION OF THE IMAGE 1006

GENERATING, BY THE MACHINE LEARNING MODEL, AN IMAGE BASED ON THE CONTROL ELEMENT, THE SUB-PROMPT, AND THE RELATIONSHIP, WHEREIN THE IMAGE INCLUDES VISUAL ELEMENTS CORRESPONDING TO THE CONTROL ELEMENT AND THE SUB-PROMPT 1008

TARGET SCENE COMPOSITION USING GENERATIVE AI

CROSS-REFERENCE TO RELATED APPLICATIONS

This application claims the benefit of U.S. Provisional Application No. 63/416,882, filed Oct. 17, 2022, which is hereby incorporated by reference.

BACKGROUND

Digital tools allow artists to manifest creative efforts in a digital workspace. For example, an artist (or other creator) creates a scene in the digital workspace. The scene is a set of concepts, or objects and inter-object relationships, created in a digital workspace resulting from an artists creative efforts/ideas. In particular, the scene includes a composition (or structural arrangement) of visual elements. Sometimes, artists create each of the objects (or other visual elements) of the scene. Alternatively, artists may reuse portions of previously created objects and adapt such objects to a new scene. However, varying artist skill levels result in an inconsistent quality of a scene and varying degrees of effort, time, and resources (both computing resources and human resources) required to create the scene. Moreover, adapting previously created objects to new scenes can be significantly time consuming.

SUMMARY

Introduced here are techniques/technologies that generate a composed target scene using natural language prompts. In other embodiments, the composed target scene is further based on a source image. The composed target scene includes a structure according to any desired style, visual element, and/or image operation included in the natural language prompt. The generation of the target scene enables users to create digital art using natural language descriptions of the user's creative ideas. In effect, the target scene generation system manifests a user's creative ideas, regardless of the user's skill. Using a prompt, or a natural language instruction, a target scene generation system creates composites of images and/or generates images to facilitate a user's creative exploration.

More specifically, in one or more embodiments, the target scene generation system decomposes a received textual description of a target scene into isolated sub-prompts for image generation. Such decomposition is performed using natural language processing techniques. Moreover, the decomposition performed by the target scene generation system parses control language from sub-prompts (such as objects) of the target scene, where the control language defines image operations on the composition of visual elements.

The target scene generation system also derives groupings of the sub-prompts from the arrangement of the control language pieces, and a grammatical structure of the prompt. Such groupings are transformed into visual elements of the scene, as well as additional image operations. Lastly, a user can edit a generated scene, where the generated scene is a recommendation determined by the target scene generation system of arranged visual elements according to image operations and sub-prompts.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 10 illustrates a flowchart of a series of acts in a method of composing a target scene using a natural language description in accordance with one or more embodiments.

DETAILED DESCRIPTION

One or more embodiments of the present disclosure include a target scene generation system that creates composites of images and/or generates images into a structured scene using a prompt. One conventional approach involves manually creating visual elements of a scene and adapting the visual elements to fit the user's creative effort. However, this approach is time consuming and the manually created images vary based on a user's skill level. Other conventional approaches automatically generate images from a provided image and a description of a style. However, these approaches fail to generate a structured scene. For example, the composition of visual elements does not preserve the original image details (or the user's target scene description). In other words, the structure of visual elements is not layered or otherwise arranged appropriately in the scene.

To address these and other deficiencies in conventional systems, the target scene generation system of the present disclosure combines natural language processing to analyze and decompose textual descriptions, textual image operations to define a composition, and generative AI to automatically create a composite image with desired styles, visual elements, and image operations.

Providing a scene recommendation to a user that includes structured visual elements (e.g., a composition) reduces computing resources such as power, memory, and bandwidth spent tuning, creating, or otherwise adapting visual elements of a target scene. For example, the target scene generation system of the present disclosure preserves the composition of a target scene by decomposing the natural language description of the target scene. Decomposing the natural language description results in an identification of control language and an identification of descriptive scene language, which allows groups of sub-prompts to be derived. Because of the groupings, structural composition of the target scene is achieved. In this manner, a likelihood of a generated scene that fails to preserve the composition of the target scene is reduced. Accordingly, a user does not have to execute the scene generation algorithms multiple times (or refine the structure of generated scenes) as a result of a failed structural composition of visual elements.

Figure 1:
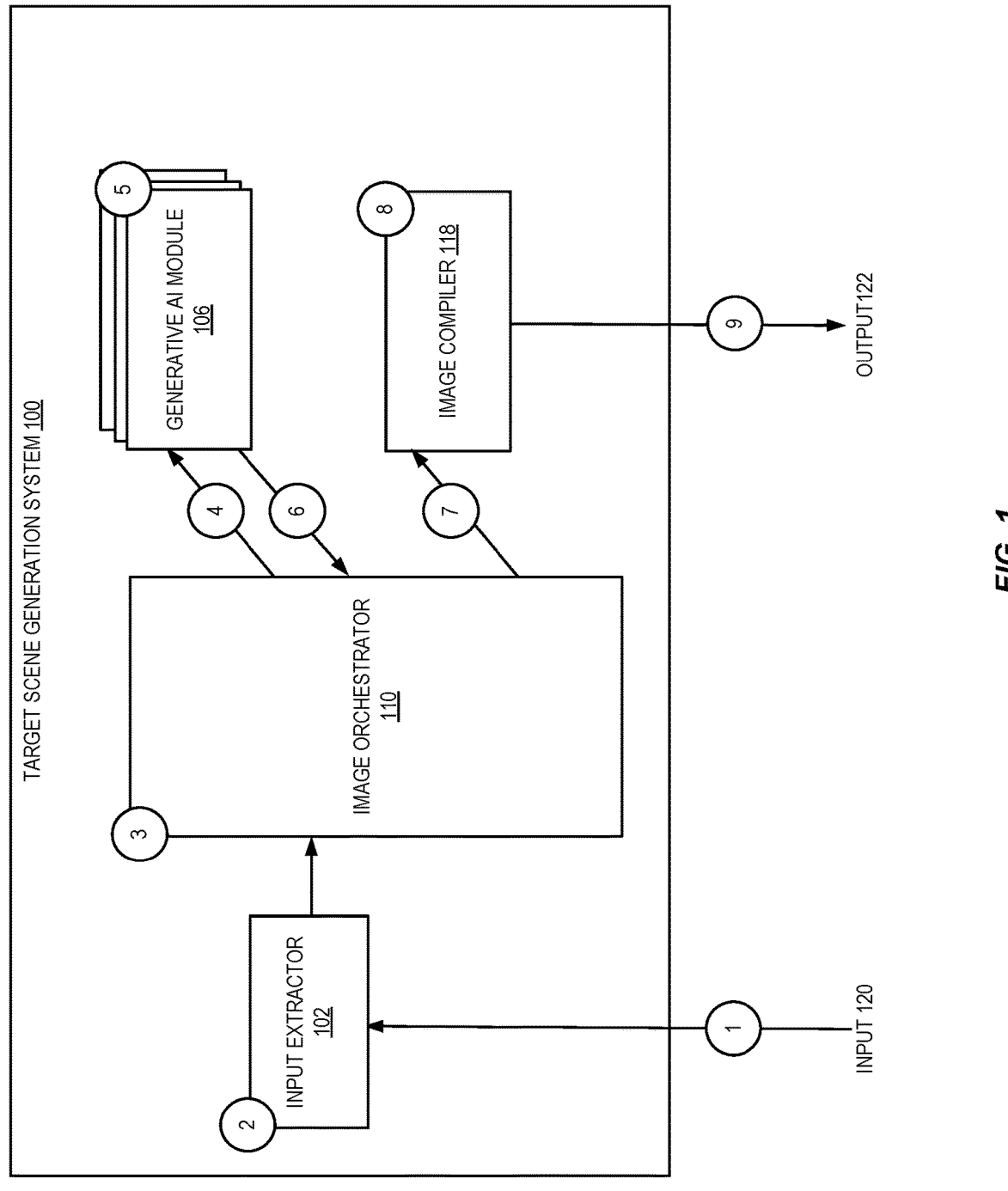
FIG. 1 illustrates a diagram of a process of generating target scenes based an input, in accordance with one or more embodiments.

FIG. 1 illustrates a diagram of a process of generating target scenes based on an input, in accordance with one or more embodiments. As shown in FIG. 1, embodiments include a target scene generation system 100. The target scene generation system 100 includes an input extractor 102, an image orchestrator 110, one or more modules (such as a generative AI module 106), and an image compiler 118.

At numeral 1, the target scene generation system 100 receives an input 120. The input 120 is a prompt, or a textual description containing 1) image operations, 2) a sentence with a grammatical structure that reflects composition and/or 3) objects and subjects. A desired composition (otherwise referred to herein as a target scene or a description of an image to be generated) is described using the prompt in a natural language format.

In some embodiments, the target scene generation system 100 receives a source image as part of input 120. The source image may be a computer-generated image, a user-uploaded image (such as a frame of a video, a picture captured by a camera (or other sensor)), and the like. In some embodiments, the source image is used as a foundation (or baseline) for the target scene determined by the target scene generation system 100. For example, the target scene generation system 100 may revise visual elements of the source image, add visual elements (or remove visual elements), and the like, to change the composition of the source image.

In some embodiments, the source image is a previously generated image (e.g., output 122). In these embodiments, the input 120 may include a revision to a previous description of a scene (e.g., a revised prompt). These inputs correlate to user revisions/modifications to a scene based on a displayed scene (e.g., output 122). The revisions to the previous description of the scene include natural language descriptions of a revision, or detected user interactions with a portion of the scene. The detected user interactions include a mouse compression, a mouse decompression, haptic feedback, a keyboard entry, a voice command, and the like. In a particular example, a user may resize a visual element of the scene by clicking/dragging a portion of a visual element of the output 122. As a result, the input 120 to the target scene generation system 100 includes the adjustments to the portion of the visual element, and a revised visual element is generated.

At numeral 2, the input extractor 102 extracts information from the input using any one or more modules, as described with reference to FIG. 2. In operation, the input extractor 102 identifies and parses out information defining visual elements of a target scene (e.g., an arrangement/composition of objects in an image). For example, such parsed information from a natural language description of the image (e.g., input 120) can include identifying control language and sub-prompts from a received prompt. While the present disclosure describes control language and sub-prompts primarily, it should be appreciated that other information may be extracted from the input using one or more modules of the input extractor 102. The parsed information (e.g., control language and sub-prompts) are used to generate visual elements (e.g., objects) in a target scene.

At numeral 3, the image orchestrator 110 maps information parsed from the input to one or more modules. For example, the image orchestrator may receive sub-prompt(s) and control language. The image orchestrator 110 provides the information determined from the input 120 to subsequent modules such as the generative AI module 106 and the image compiler 118. For example, the image orchestrator 110 may receive sub-prompts determined by a structural analyzer 204 of the input extractor 102 as described in FIG. 2. Subsequently, the image orchestrator 110 provides such sub-prompts to the generative AI module 106. By providing the sub-prompts to the generative AI module 106, the image orchestrator 110 determines how many times the generative AI module 106 is executed (e.g., how many visual elements should be generated by the generative AI module 106). Similarly, the image orchestrator 110 may receive control language determined by a control language identifier 202 of the input extractor 102 described in FIG. 2. Subsequently, the image orchestrator 110 provides such control language to the image compiler 118. By providing control language to the image compiler 118, the image orchestrator 110 can arrange a composition of the target scene.

In some embodiments, the image orchestrator 110 determines one or more semantically related terms to sub-prompts and/or control language parsed from input 120. The image orchestrator 110 may also group the semantically related terms to sub-prompts and/or control language to preserve a relationship between the semantically related terms and the sub-prompts and/or control language. The image orchestrator 110 may perform any one or more semantic similarity analyses to determine features/characteristics corresponding to the sub-prompt. Such semantically related features/characteristics corresponding to the sub-prompt may be obtained from one or more external or internal (not shown) databases, data stores, memory, servers, applications, etc. For example, the image orchestrator 110 may retrieve mapped features/characteristics of sub-prompts. Responsive to determining/obtaining one or more semantically related features/characteristics corresponding to a sub-prompt, the image orchestrator 110 may provide a feature of the set of one or more semantically related features corresponding to the sub-prompt to the generative AI module 106. In this manner, the generative AI module 106 generates visual elements of one or more features of a sub-prompt.

In a non-limiting example, a sub-prompt extracted from input 120 may include "pirate." Responsive to receiving the sub-prompt, the image orchestrator 110 may determine a semantically related feature of a pirate. For example, a semantically related feature corresponding to a pirate may be a smirk. Subsequently, the image orchestrator 110 provides the "smirk" feature corresponding to the pirate sub-prompt to the generative AI module 106. As a result, the generative AI module 106 generates a facial expression of a "smirk." To ensure that the generated "smirk" feature is applied to the pirate sub-prompt, the image orchestrator 110 groups the "smirk" feature and the pirate sub-prompt. In this manner, the relationship between the "smirk" and "pirate" is preserved when the image compiler 118 arranges visual elements to generate an image, as described herein.

The image orchestrator 110 may determine a number of features of the set of one or more semantically related features to provide to the generative AI module 106 according to a user configurable parameter or other information extracted from the input. For example, responsive to a user indicating a highly stylized target scene, the image orchestrator 110 will determine to send more features of the set of features to the generative AI module 106. By sending more features of a sub-prompt to the generative AI module 106, the image orchestrator 110 receives more visual elements semantically related to the sub-prompt. As a result, the target scene includes more visual elements. In contrast, responsive to a user indicating a low stylized target scene, the image orchestrator 110 will determine to send fewer features of the set of features to the generative AI module 106. By sending fewer features of a sub-prompt to the generative AI module 106, the image orchestrator 110 receives fewer visual elements semantically related to the sub-prompt. As a result, the target scene includes fewer visual elements.

At numeral 4, the image orchestrator 110 provides image information to the generative AI module 106 such that the generative AI module 106 can generate visual elements. For example, the image orchestrator 110 provides each sub-prompt of a set of sub-prompts (e.g., one or more sub-prompts extracted from input 120) to the generative AI module 106. Additionally or alternatively, the image orchestrator 110 provides each feature of a set of features corresponding to a sub-prompt to the generative AI module 106. The image orchestrator 110 may also provide control language to the generative AI module 106 depending on the control language determined from the input 120. For example, some control language includes effects such as frames, shapes, shadows, exposure, etc. These effects require generation of a visual element by the generative AI module 106. This control language is referred to herein as a control element. Other control language may indicate an image operation and/or a composition operation. Such control language is not a control element and therefore does not correspond to a generation of a visual element by the generative AI module 106.

At numeral 5, the generative AI module 106 generates a visual element (e.g., an object or a subject) of a target scene using the information received from the image orchestrator (e.g., each of the sub-prompts, features, and/or control elements). The generative AI module 106 generates the image using the control elements, sub-prompts, and a relationship identified between the control elements and sub-prompts (determined using the input extractor 102 as described herein) obtained from the natural language description of the image (e.g., input 120).

In some embodiments, the generative AI module 106 may receive a batch of prompts, where each prompt in the batch of prompts includes a sub-prompt, feature of a sub-prompt, and/or control element. The sub-prompts, feature of the sub-prompt, and/or control element each corresponding to a subject/object (e.g., a visual element) of the target scene. In other embodiments, the generative AI module 106 may receive a single prompt including multiple sub-prompts, features, and/or control elements.

The generative AI module 106 may be any generative AI configured to generate an image using a natural language prompt. In some embodiments, the generative AI module 106 generates neural images and neural layers based on the sub-prompt. In other embodiments visual elements generated by the generative AI module 106 may be generated from scratch (e.g., using the generative AI module 106) and/or generated using a source image (e.g., an image containing one or more objects received as part of input 120).

The generative AI module 106 may be any artificial intelligence including one or more neural networks. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

At numeral 6, the generative AI module 106 passes each generated visual element to the image orchestrator 110. As a result, the image orchestrator 110 obtains all of the foreground objects and background objects (e.g., objects, visual elements, subjects, etc.) associated with a target scene. The image orchestrator 110 may store each received generated visual element in a buffer or other memory until all of the visual elements associated with the target scene (or a portion of the target scene) are generated.

Figure 2:
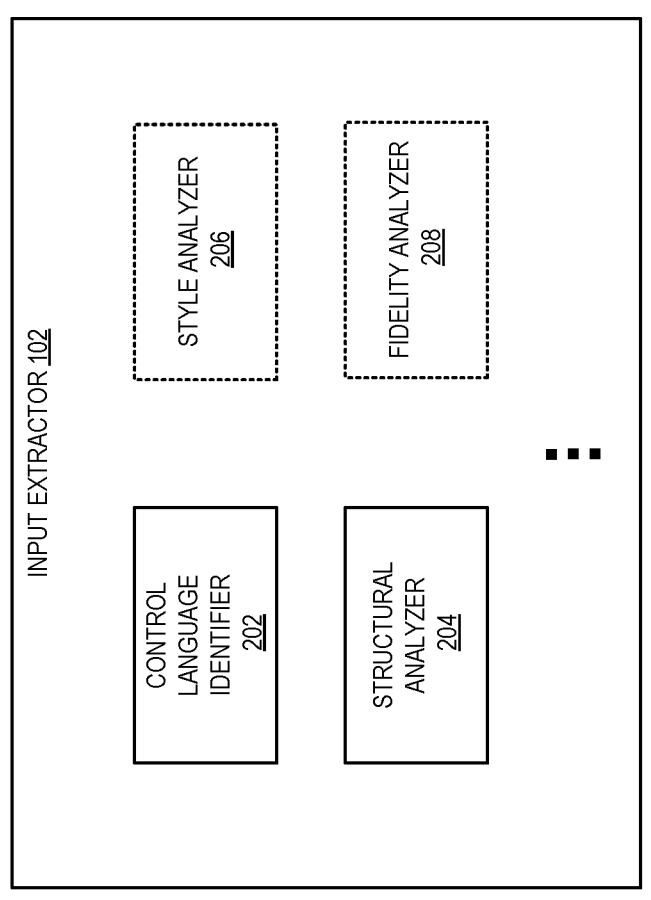
FIG. 2 illustrates an example of the Input extractor, in accordance with one or more embodiments.

As shown at numerals 4-6, the image orchestrator 110 passes information extracted from input 120 (using one or more components of the input extractor 102, as described in FIG. 2) to a module (illustrated here as a generative AI module 106). Subsequently, the module passes visual elements back to the image orchestrator 110. Responsive to receiving all visual elements corresponding to a target scene (or a portion of visual elements corresponding to a portion of the target scene), the image orchestrator 110 passes the visual elements to the image compiler 118 for target scene composition.

While only one module (e.g., the generative AI module 106) is shown, it should be appreciated that different modules may be called by the image orchestrator 110 to perform one or more operations based on the extracted input information. For example, a stylizer module (not shown) may be called by the image orchestrator 110 to generate a visual element and/or revise a visual element responsive to an extracted one or more style descriptions determined from input 120. The image orchestrator 110 calls the stylizer module to generate a visual element and/or revise a visual element using the extracted style description(s) received from the input extractor 102.

At numeral 7, the image orchestrator 110 passes all of the received visual elements (determined via the generative AI module 106) and any control language (determined via the input extractor 102) to the image compiler 118. In some embodiments, the image orchestrator 110 reformats the visual elements and/or control language before passing the information to the image compiler 118.

At numeral 8, the image compiler 118 arranges one or more received visual elements in a representation (e.g., a target scene or an image) that the user can edit and further refine. As described above, refinements may include natural language descriptions of adjustments to one or more portions of the target scene, user interactions with one or more portions of the target scene, and the like. Refinements may include a revision to a visual element or the source image. Moreover, refinements may include resizing revisions, color revisions, position revisions, and the like.

The image compiler 118 is configured to perform one or more layering operations, image operations, and the like, to compile the image (e.g., a target scene). For example, the image compiler 118 may arrange a pirate in a target scene using several generated visual elements (e.g., a smirk, rosy cheeks, etc.) corresponding to the pirate and a source image.

Moreover, additional visual elements, including a parrot and a hat, are arranged in the target scene.

Figure 4:
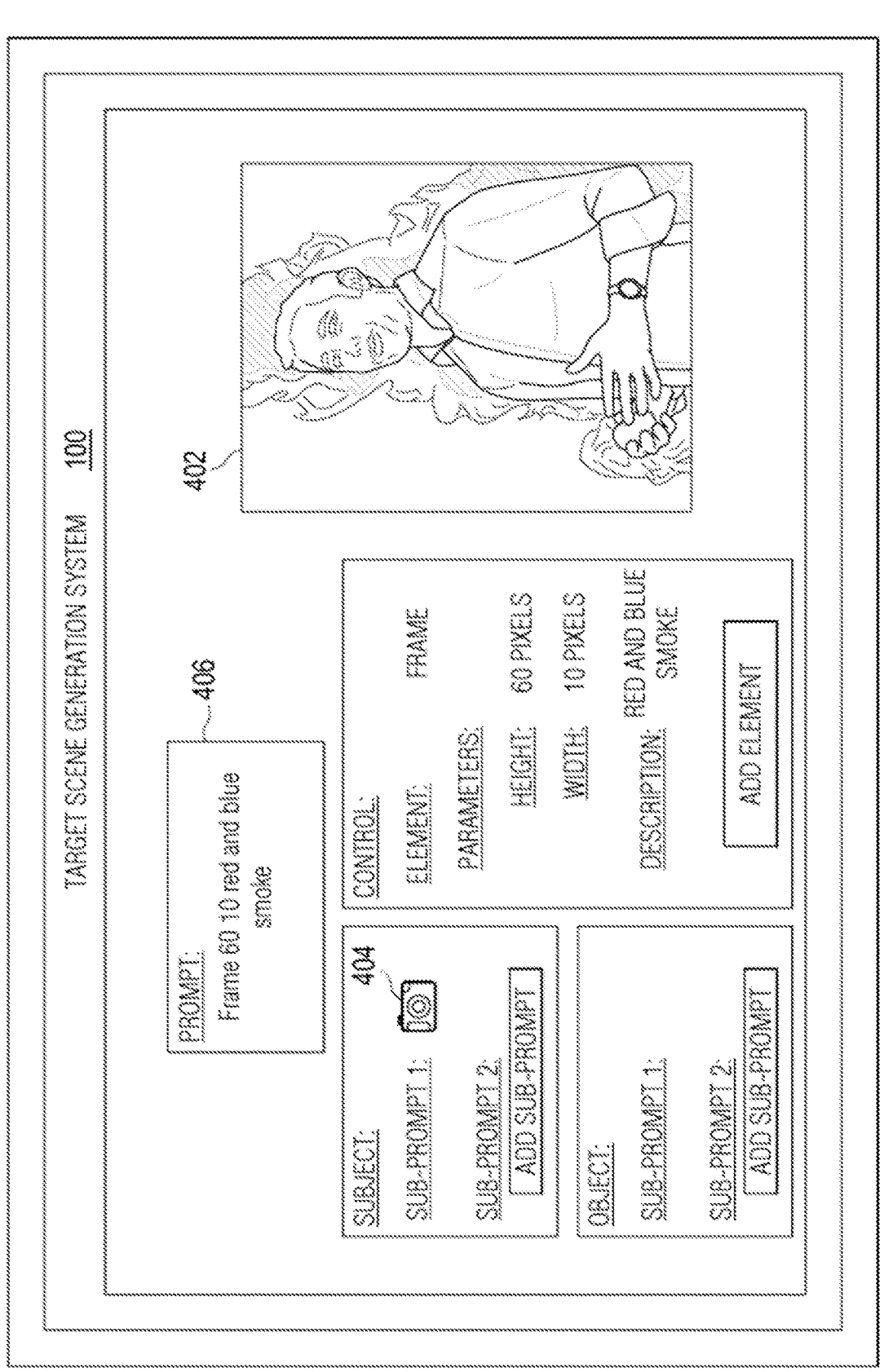
FIG. 4 illustrates an example frame generated image, in accordance with one or more embodiments.

The image compiler 118 also leverages the identified control language. Using the control language (and/or any other grammatical/structural relationships identified by the input extractor 102), the image compiler 118 performs one or more operations. Operations performed by the image compiler 118 include "select subject" (in which a subject of a source image is identified using one or more functions), layering (in which visual elements are applied to each other in an ordered fashion), remove background, duo tone (in which contrasting colors are applied to the target scene), exposure (in which the luminosity of the target scene is adjusted), cutout (in which one or more portions of a visual element and/or source image are removed), etc. FIG. 4 illustrates a frame generated image and describes in more detail the operations of the image compiler 118. In some embodiments, control elements may translate to specific neural layers (corresponding to generated images determined using generative AI module 106). In some embodiments, the image compiler 118 combines neural images and neural layers. In other embodiments, the generative AI module 106 combines neural images and neural layers.

At numeral 9, the image compiler 118 provides the target scene as output 122. The target scene is structured (or composed/compiled) according to the input. The target scene is a customizable image based on the received prompt input (and in some embodiments, the received source image). The output 122 is displayed on one or more user devices and/or communicated to one or more downstream devices (e.g., servers, applications, systems, processors, or some combination). The downstream devices may perform subsequent processing on output 122.

FIG. 2 illustrates an example of the input extractor, in accordance with one or more embodiments. As described herein, the input extractor 102 extracts information from a prompt (e.g., a text description as part of input 120) and/or a source image using one or more modules. As shown, modules include a control language identifier 202 and a structural analyzer 204. However, additional modules may be executed by the input extractor 102 to extract different types of information from input 120 (including the prompt and/or any images).

For example, style analyzer 206 may be executed by the input extractor 102 to identify style information present in a prompt. Style information may include nouns (or other parts of speech) describing a style or theme. In some embodiments, the style analyzer 206 determines terms semantically related to the identified style/theme using any semantic similarity analysis and/or dictionary mapping terms to styles/themes. The semantically related terms may be fed as sub-prompts and/or features of sub-prompts to the generative AI module 106. In this manner, the generative AI module 106 is encouraged to generate diverse objects in a scene.

Additionally or alternatively, fidelity analyzer 208 may be executed by the input extractor 102 to extract a degree of stylization associated with the target scene. For example, a prompt including adjectives and/or adverbs may describe a degree or artistic expression (or a degree of fidelity). In a non-limiting example, a prompt describing "an mad butterfly" may result in a more artistically expressive representation of a butterfly output from the generative AI module, as opposed to a prompt describing "a butterfly" output from the generative AI module. The degree of stylization extracted by the fidelity analyzer 208 may determine a number of semantically related terms associated with the input 120. For example, to generate the "mad butterfly" described above, the image orchestrator determines a higher number of semantically related features/characteristics corresponding to the "mad" sub-prompt. In contrast, to generate the "butterfly", the image orchestrator feeds the prompt "butterfly" to the generative AI module 106 (instead of additional terms semantically related to "mad"). In some embodiments, the fidelity analyzer 208 maps adjectives/adverbs to a number of semantically related terms to be generated.

In some embodiments, an image comparator (not shown) may be executed by the input extractor 102 to identify adjustments to one or more visual elements and/or adjustments to a source image. For example, the image comparator may compare a generated visual element (produced as part of output 122) to an adjusted visual element (received as part of input 120). By comparing the generated visual element to the adjusted visual element, the image comparator can determine changes to the generated visual element including color changes, size changes, position changes, and the like.

In a particular example, the input extractor 102 identifies and extracts control language from a prompt. Control language is identified using the control language identifier 202. Control language may refer to language describing control elements which are visual elements such as borders (e.g., frames), shapes (e.g., circles), vignettes, one or more effects (e.g., double exposure), and the like. Control language may also refer to language describing a composition of a scene. The control language identifier 202 identifies control language using any suitable mechanism. For example, the control language identifier 202 identifies control language in a prompt using string matching by comparing a string in the prompt to a collection of control language. In other embodiments, the control language identifier 202 identifies control language in a prompt using semantic similarity techniques (e.g., determining semantically similar terms in the prompt to control language). For example, a string of characters in the prompt may be semantically related to a collection of control elements.

In some embodiments, control elements identified by the control language identifier 202 are defined by a specific set of parameters. In some embodiments, the control element determines the number and type of parameters. For example, a frame element may require parameters such as a width (integer), a height (integer), and a description (string). In a particular example, a prompt may include "frame 60 10 blue and red smoke." Other control elements may have different parameters. For example, a blur control element may blur a defined area using radial parameters. In this example, the parameters of the blur control element may include a radial x-value and a radial y-value indicating a radius of blur in the x direction and y direction respectively. The area to be blurred may be described using a string, or coordinates of an image.

In operation, a prompt including control language (such as a frame) describes a size of a frame, a configuration of the frame, and a textural description of the style or any stylistic elements of the frame. In some embodiments, if parameters of a particular control element are not defined in the prompt (e.g., a user did not specify a width of a frame), the control language identifier 202 may determine one or more default parameters. FIG. 4 described herein illustrates an example frame generated image.

In some embodiments, the control language identifier 202 is configured to derive groupings from an arrangement of control language and a grammatical structure of the prompt. In some embodiments, groupings may be translated into one or more image operations.

The control language identifier 202 may derive groupings using any suitable grouping technique (e.g., any natural language processing technique, any clustering technique, etc.). For example, the control language identifier 202 executes a natural language toolkit (NLTK) to identify grammatical relationships of the prompt. The identified grammatical relationships group related information of the prompt. The control language identifier 202 may indicate such groupings to the image orchestrator 110. As a result, the image orchestrator 110 passes the groupings to the image compiler 118 such that a target scene is generated that preserves the structure of the prompt (e.g., input 120). The groupings preserve the relationship of the objects in the group such that visual elements (corresponding to the objects of the group) are arranged by the image compiler 118 according to the group. For example, a prompt describing "pirate wearing a hat with a parrot on the shoulder frame rectangle 60 20 colors" may result in the control language identifier 202 deriving a frame grouping. The frame grouping groups the frame with the parameters of the frame (e.g., '60', '20', and 'colors'). Additionally or alternatively, the control language identifier 202 groups the frame with a subject of the image (e.g., a pirate). As described herein, the structural analyzer 204 may also derive groups. For example, a pirate is grouped with a hat and a parrot. Accordingly, one subject (e.g., a pirate) may be in two groups (e.g., a frame, and a group of pirate objects). Alternatively, one group may include both control elements and subject/object relationships (determined by the structural analyzer 204). As described herein, the image compiler 118 may perform image operations on such groupings.

In some embodiments, the input extractor 102 executes a structural analyzer 204 to identify sub-prompts (including subjects, related objects, and properties (e.g., adjectives)). In some embodiments, the structural analyzer 204 is executed on a remaining prompt (e.g., an input 120 with parsed out control language). It should be appreciated that while the present disclosure describes the structural analyzer 204 being executed on a remaining prompt (e.g., after the control language identifier 202 is executed), the structural analyzer 204 may be executed before the control language identifier 202 (and/or in parallel with the control language identifier 202).

In operation, one more NLP algorithms are leveraged by the structural analyzer 204 to identify different parts of speech and their relationships in a remaining prompt. In a particular example, the structural analyzer 204 may employ a perceptron tagger, which tags parts of speech using the averaged perceptron algorithm.

Parsing the remaining prompt isolates sub-prompts for image generation. In a particular example, a remaining prompt describes "a pirate wearing a hat with a parrot.". Sub-prompts identified by the structural analyzer 204 include "pirate", "hat", and "parrot" and such sub-prompts are generated as visual elements using the generative AI module 106. Each sub-prompt identified by the structural analyzer 204 may include a noun of the subject/object of the input, and any associated properties (e.g., adjectives).

By identifying sub-prompts including subjects, related objects, and related properties using part of speech tagging, the structural analyzer 204 derives groupings from the grammatical structure of the remaining prompt. Additionally or alternatively, the structural analyzer 204 determines groupings from the remaining prompt using any grouping technique such as any one or more natural language processing techniques, clustering techniques, and the like. For example, the structural analyzer executes a NLTK to identify grammatical relationships between verbs, nouns, and adjectives of the remaining prompt. The identified grammatical relationships become groupings of related subjects, objects, and properties of the remaining prompt. The structural analyzer 204 may indicate such groupings to the image orchestrator 110. As a result, the image orchestrator 110 passes the groupings to the image compiler 118 such that a target scene is generated that preserves the structure of the prompt (e.g., input 120). As described herein, the image compiler 118 may perform image operations on such groupings. In some embodiments, the groupings are translated into neural images and/or neural layers (e.g., an object in the target scene).

The relationship of visual elements in a scene (and/or any determined groupings) affect the composition/structural arrangement of the scene. For example, a prompt describing "a pirate wearing a hat with a parrot on the shoulder" should result in a target scene/image with a pirate as the subject of the scene, and a hat and parrot associated with the pirate. In this manner, a group is created where the hat and parrot are related to a pirate. If groupings were not considered, the target scene generation system 100 (and specifically the image compiler 118) may compose a target scene with a poor scene composition. For example, a system may generate an image with a pirate, hat, and parrot aggregated together.

In some embodiments, relationships that are parsed from the remaining prompt by the structural analyzer 204 determine a neural composition program. Neural compositioning is a model agnostic, dynamic, context-sensitive, and personalized approach to using generative models. Neural compositioning is used to generate neural images for a subject of a composition, and a neural layer for each related object. The relationships between the nouns in the remaining prompt (e.g., subject and related objects) specify the neural image (subject) and the neural layers that are applied to it (the objects). In an example, the structural analyzer 204 parses out "pirate" (a neural image because the pirate is the subject), "hat" (a neural layer because the hat is an object related to the pirate), and "parrot" (another neural layer because the parrot is an object related to the pirate).

Figure 3:
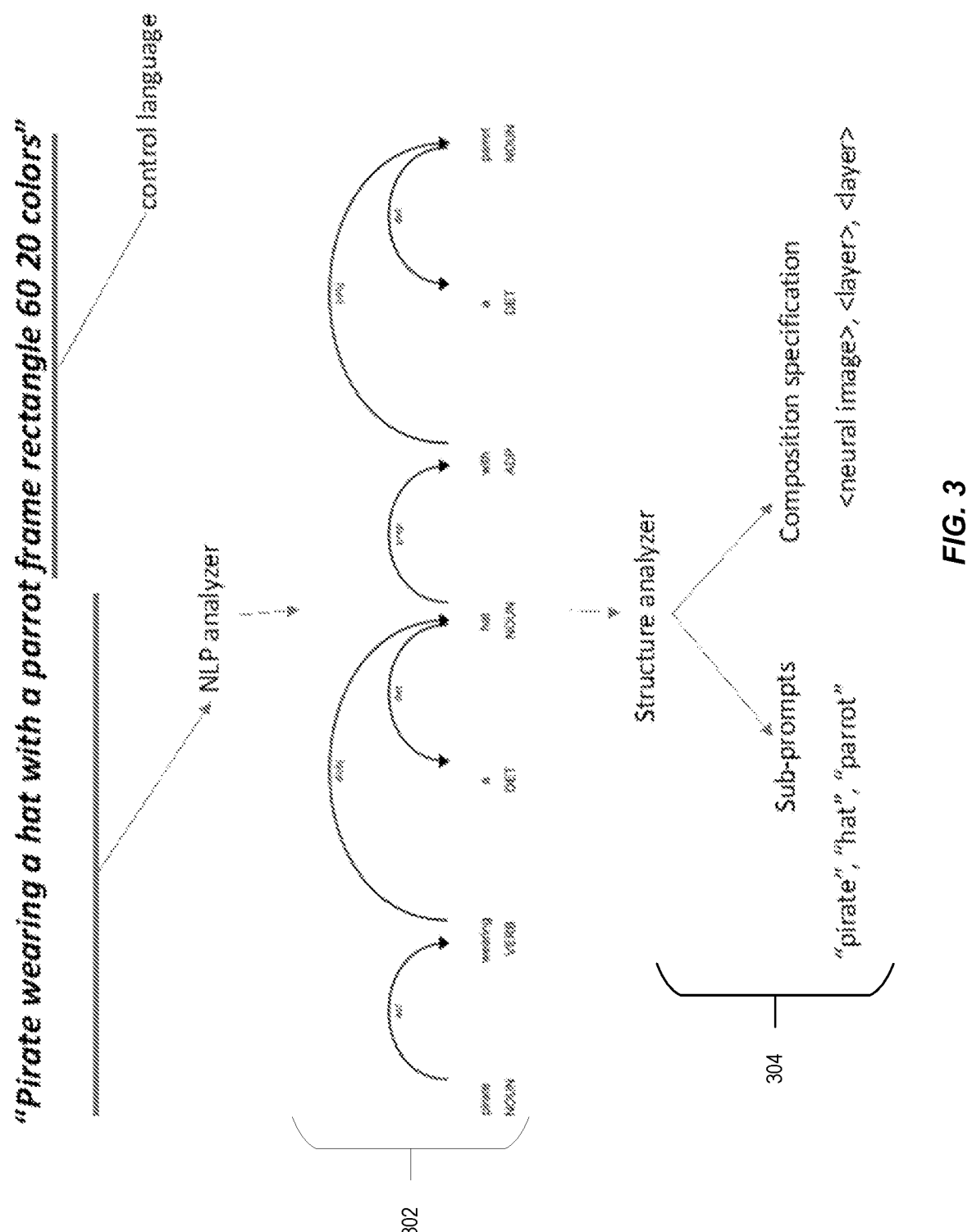
FIG. 3 illustrates a natural language prompt being processed by the input extractor, in accordance with one or more embodiments.

FIG. 3 illustrates a natural language prompt being processed by the input extractor 102, in accordance with one or more embodiments. As illustrated, the prompt describes "pirate wearing a hat with a parrot frame rectangle 60 20 colors." As described herein, the control language identifier 202 of the input extractor 102 operates on the prompt to identify control language (and specifically control elements) including "frame rectangle 60 20 colors." The remaining prompt "pirate wearing a hate with a parrot" is operated on by the structural analyzer 204.

As shown, 302 illustrates an example of extracted part of speech tags and their relationships using a tagger implemented by the structural analyzer 204. As shown, the structural analyzer 204 determines groupings based on the relationships of words in the remaining prompt. Each grouping groups properties of a noun (or subject/object). As described herein, groupings may also include (or otherwise be associated with) control language (such as a frame control element).

As shown at 304, the structural analyzer 204 of the input extractor 102 parses the remaining prompt to isolate sub-prompts for visual element generation. Sub-prompts identified by the structural analyzer 204 include "pirate", "hate", and "parrot" and such sub-prompts are generated into images or visual elements using the generative AI module 106. As illustrated in 302, a group is formed with "pirate"

"wearing" hat." As described herein, the image compiler 118 receives such groupings to group the "pirate" and "hat" visual elements together in a manner such that the generated pirate visual element has a relationship with (e.g., is wearing) the generated hat visual element. In some embodiments, starting from the main noun or subject, the structural analyzer 204 identifies (and in some embodiments, generates) a neural image for the subject and adds neural layers for each related object.

FIG. 4 illustrates an example frame generated image, in accordance with one or more embodiments. The input 120 received by the target scene generation system 100 may include a source image (identified by sub-prompt 404) and the free text description "frame 60 10 red and blue smoke" (identified by prompt 406). Responsive to such an input (e.g., the source image and the prompt), the target scene generation system 100 performs the processes described herein to decompose the prompt into control langue and sub-prompts, as a result, image 402 is created as a target scene.

In particular, the input extractor 102 (and specifically the control language identifier 202) parses out "frame 60 10 red and blue smoke." The control element and corresponding set of parameters is passed to the image orchestrator 110. The image orchestrator 110 passes the control element to the generative AI module 106 such that the generative AI module 106 can generate a smokey image based on the prompt "red and blue smoke". Subsequently, the generative AI module 106 passes the smokey image to the image orchestrator 110, which provides the smokey image and the source image to the image compiler 118. The image compiler 118 performs a composition operation using the smokey image and the source image.

In some embodiments, the composition operation associated with a "frame" control element includes a "select subject" operation on an image and a layering of a "60 10" cutout of the generated red and blue smoke image on the subject. That is, the image compiler 118 applies a first visual element (e.g., the red and blue smokey generated image) to a second visual element (e.g., a source image) in a layering operation. Specifically, the image compiler 118 identifies a subject of the source image. Subsequently, the image compiler 118 cuts out a layer of "60 10" from the generated red and blue smoke image (e.g., the smokey image). In operation, image compiler 118 performs an image operation on the generated smokey image to create a frame by cutting the generated image to 60 pixels high and 10 pixels wide. Subsequently, the image compiler 118 layers the frame and the source image by applying the frame to the source image. As a result, in image 402, the frame highlights the subject in the source image. The frame is red and blue smoke.

Figure 5:
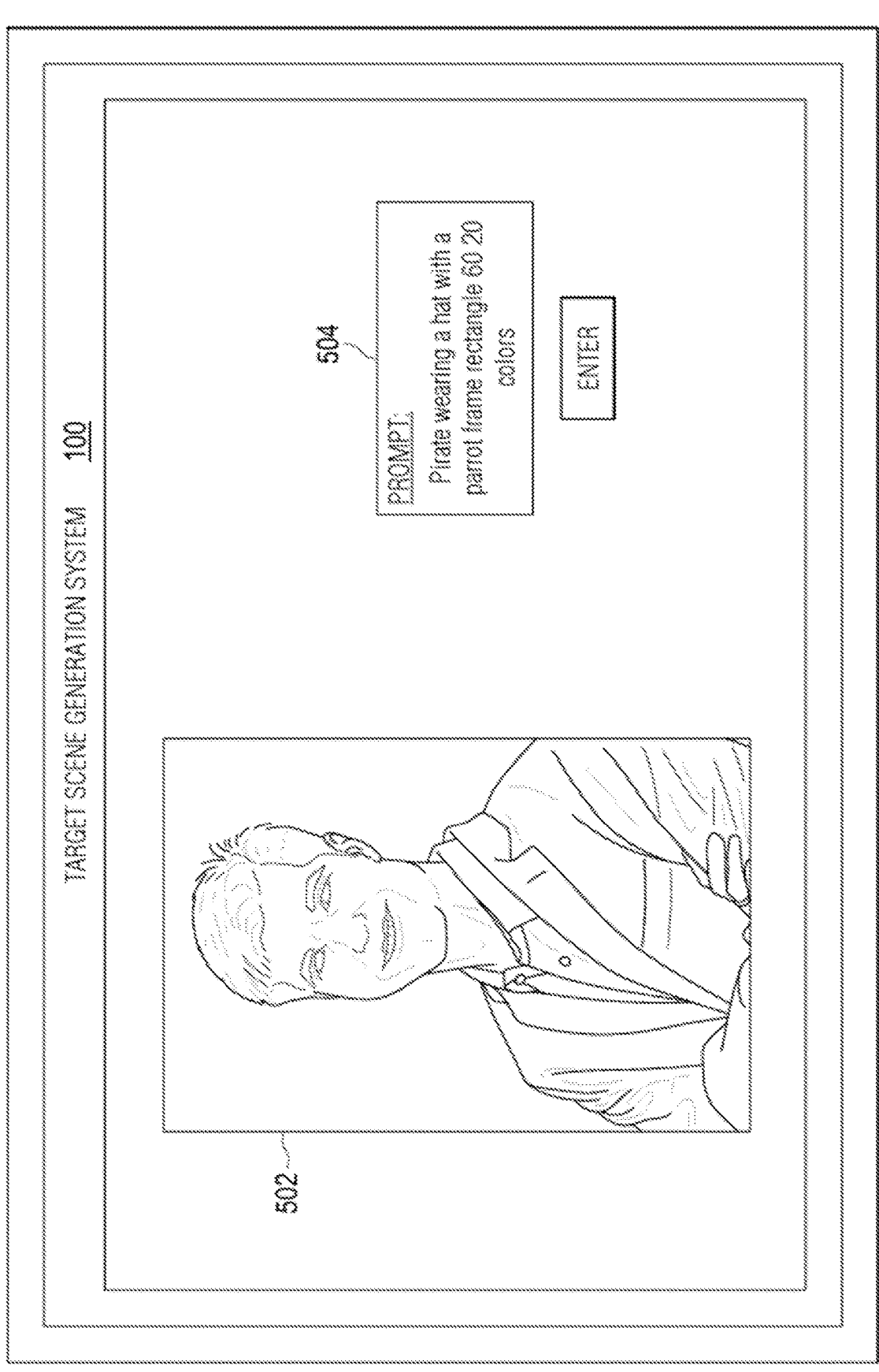
FIGS. 5-6 illustrate an example of a described scene and a corresponding recommended target scene, in accordance with one or more embodiments.
Figure 6:
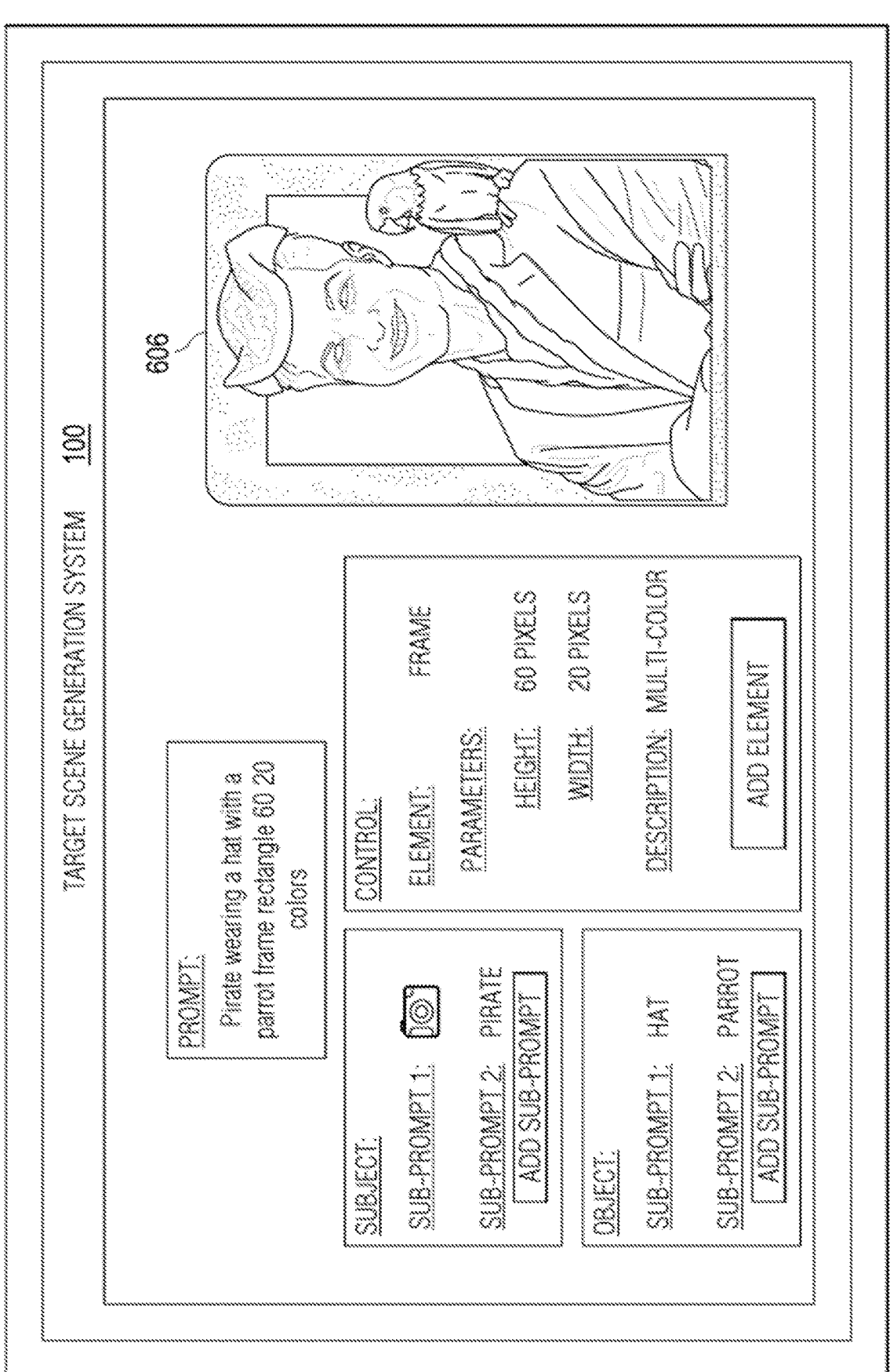

FIGS. 5-6 illustrate an example of a described scene and a corresponding composed target scene, in accordance with one or more embodiments. As illustrated in FIG. 5, inputs provided to the target scene generation system 100 include a source image 502 and a description of a scene at 504 to the target scene generation system 100. As illustrated in FIG. 6, in response to the inputs (e.g., the prompt, or the description of a scene at 504 and the source image 502), the target generation system 100 generates a target scene 606. As illustrated, the natural language description (e.g., prompt 504) is decomposed into sub-prompts and control elements. The sub-prompts and control elements are used to generate visual elements as a human would understand the prompt. Each sub-prompt/control element represents a visual element to be displayed in the target scene 606. The visual elements displayed may be generated using the generative AI model, or visual elements retrieved from a catalog/marketplace of visual elements.

As shown, the source image (e.g., image 502) is modified. Specifically, the generative AI module generates visual elements corresponding to the prompt. Subsequently, the visual elements are overlaid or otherwise incorporated into the source image using one or more image operations. For example, the subject of the source image (e.g., a human) is modified using the prompt. That is, the subject of the source image is represented as a pirate in image 606 using pirate features (e.g., smirk, rosy cheeks, etc.). Specifically, such features are overlaid or otherwise incorporated into the source image 502. Moreover, a colorful frame highlights the subject (e.g., the pirate human) in image 606. As described herein, the frame was generated and subsequently incorporated with image 502 (e.g., using cutting operations and layering operations). Image 606 also includes a hat on the head of the pirate and a parrot on the shoulder of the pirate. Accordingly, the target scene (e.g., image 606) faithfully preserves the structure of the input (e.g., the source image 502 and prompt 504).

As illustrated in FIG. 6, once the prompt has been decomposed and the target scene created, a user may further edit the target scene, or elements of the target scene, by editing the derived sub-prompts. Additionally or alternatively, a user may revise the prompt itself. Moreover, a user may interact with the target scene to edit the target scene (e.g., click on visual elements to move them, rearrange visual elements, delete visual elements, resize visual elements, change properties of the visual elements, etc.). As a result of one or more edits, a new target scene is created. That is, the edits, the source image, the prompt, and the like are fed back to the target scene generation system 100 as input 120.

Figure 7:
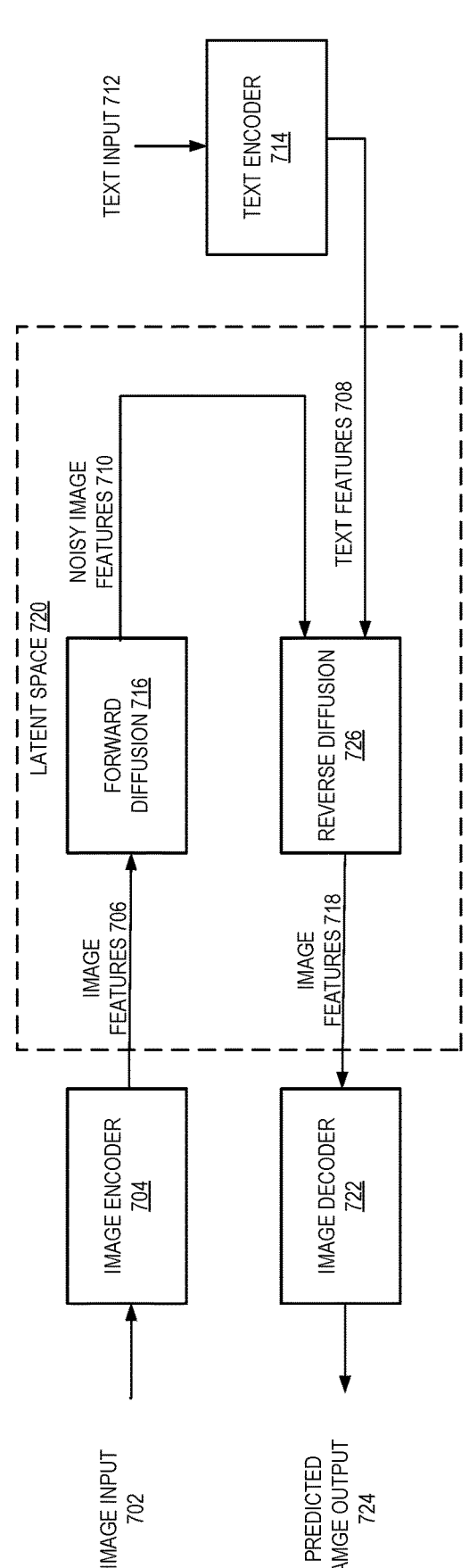
FIG. 7 illustrates an example implementation of a diffusion model, in accordance with one or more embodiments.

FIG. 7 illustrates an example implementation of a diffusion model, in accordance with one or more embodiments. As described herein, the generative AI can be performed using any suitable mechanism. In some embodiments, such generative AI is performed using a diffusion model.

A diffusion model is one example architecture used to perform generative AI. Generative AI involves predicting features for a given label. For example, given a label (or natural prompt description) "cat", the generative AI module determines the most likely features associated with a "cat." The features associated with a label are determined during training using a reverse diffusion process in which a noisy image is iteratively denoised to obtain an image. In operation, a function is determined that predicts the noise of latent space features associated with a label.

During training, an image (e.g., an image of a cat) and a corresponding label (e.g., "cat") are used to teach the diffusion model features of a prompt (e.g., the label "cat"). As shown in FIG. 7, an input image 702 and a text input 712 are transformed into latent space 720 using an image encoder 704 and a text encoder 714 respectively. As a result, latent image features 706 and text features 708 are determined from the image input 702 and text input 712 accordingly. The latent space 720 is a space in which unobserved features are determined such that relationships and other dependencies of such features can be learned. In some embodiments, the image encoder 704 and/or text encoder 714 are pretrained. In other embodiments, the image encoder 704 and/or text encoder are trained jointly.

Once image features 706 have been determined by the image encoder 704, a forward diffusion process 716 is performed according to a fixed Markov chain to inject gaussian noise into the image features 706. The forward diffusion process 716 is described in more detail with reference to FIG. 8. As a result of the forward diffusion process 716, a set of noisy image features 710 are obtained.

The text features 708 and noisy image features 710 are algorithmically combined in one or more steps (e.g., iterations) of the reverse diffusion process 726. The reverse diffusion process 726 is described in more detail with reference to FIG. 8. As a result of performing reverse diffusion, image features 718 are determined, where such image features 718 should be similar to image features 706. The image features 718 are decoded using image decoder 722 to predict image output 724. Similarity between image features 706 and 718 may be determined in any way. In some embodiments, similarity between image input 702 and predicted image output 724 is determined in any way. The similarity between image features 706 and 718 and/or images 702 and 724 are used to adjust one or more parameters of the reverse diffusion process 726.

Figure 8:
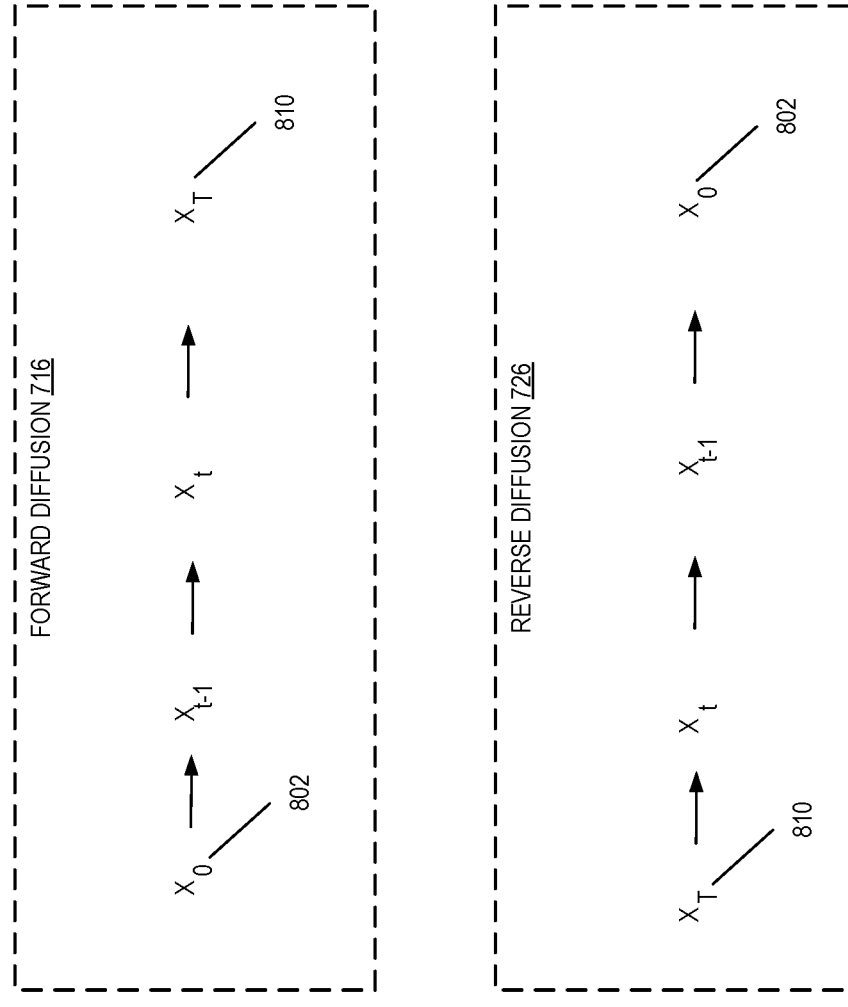
FIG. 8 illustrates the diffusion processes used to train the diffusion model, in accordance with one or more embodiments.

FIG. 8 illustrates the diffusion processes used to train the diffusion model, in accordance with one or more embodiments. The diffusion model may be implemented using any artificial intelligence/machine learning architecture in which the input dimensionality and the output dimensionality are the same. For example, the diffusion model may be implemented according to a u-net neural network architecture.

As described herein, a forward diffusion process adds noise over a series of steps (iterations t) according to a fixed Markov chain of diffusion. Subsequently, the reverse diffusion process removes noise to learn a reverse diffusion process to construct a desired image (based on the text input) from the noise. During deployment of the diffusion model, the reverse diffusion process is used in generative AI modules to generate images from input text. In some embodiments, an input image is not provided to the diffusion model.

The forward diffusion process 716 starts at an input (e.g., feature $X_0$ indicated by 802). Each time step t (or iteration) up to a number of T iterations, noise is added to the feature x such that feature $x_T$ indicated by 810 is determined. As described herein, the features that are injected with noise are latent space features. If the noise injected at each step size is small, then the denoising performed during reverse diffusion process 726 may be accurate. The noise added to the feature X can be described as a Markov chain where the distribution of noise injected at each time step depends on the previous time step. That is, the forward diffusion process 716 can be represented mathematically $$q(x_{1:T} \mid x_0) = \prod_{t=1}^{T} q(x_t \mid x_{t-1}).$$

The reverse diffusion process 726 starts at a noisy input (e.g., noisy feature $X_T$ indicated by 810). Each time step t, noise is removed from the features. The noise removed from the features can be described as a Markov chain where the noise removed at each time step is a product of noise removed between features at two iterations and a normal Gaussian noise distribution. That is, the reverse diffusion process 726 can be represented mathematically as a joint probability of a sequence of samples in the Markov chain, where the marginal probability is multiplied by the product of conditional probabilities of the noise added at each iteration in the Markov chain. In other words, the reverse diffusion process 726 is $$p_\theta(x_{0:T}) = p(x_t) \prod_{t=1}^{T} p_\theta(x_{t-1} \mid x_t), \text{ where } p(x_t) = N(x_t; 0, 1).$$

Figure 9:
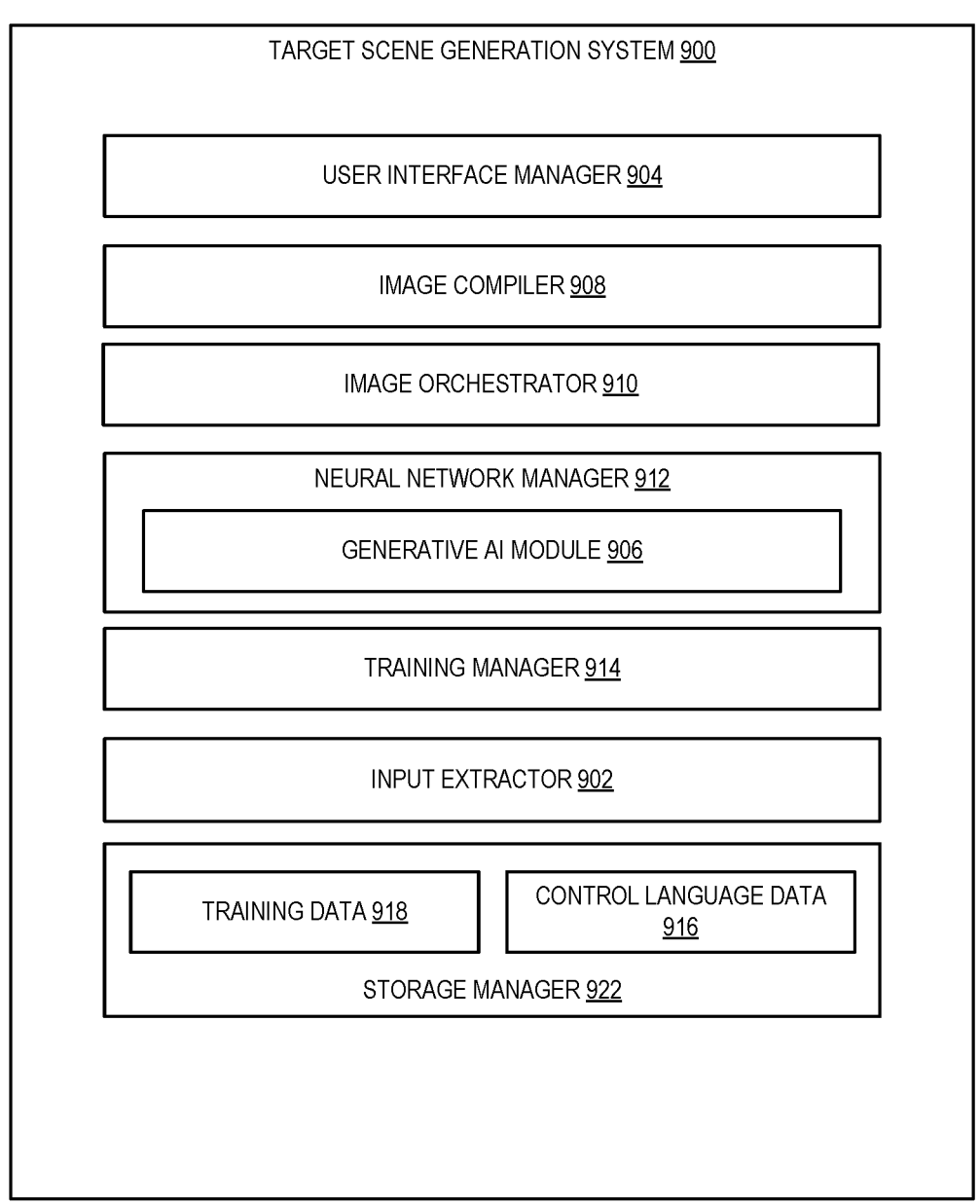
FIG. 9 illustrates a schematic diagram of a target scene generation system in accordance with one or more embodiments.

FIG. 9 illustrates a schematic diagram of target scene generation system (e.g., "target scene generation system" described above) in accordance with one or more embodiments. As shown, the target scene generation system 900 may include, but is not limited to, a user interface manager 904, an input extractor 902, an image orchestrator 910, a generative AI module 906, an image compiler 908, a neural network manager 912, a training manager 914, and a storage manager 922. As described herein, the input extractor 902 includes various modules such as a control language identifier and a structural analyzer, however these modules are not shown in FIG. 9. The storage manager 922 includes training data 918 and control language data 916.

As illustrated in FIG. 9, the target scene generation system 900 includes a user interface manager 904. The user interface manager 904 allows users to provide inputs (e.g., input 120 in FIG. 1) to the target scene generation system 900. The user interface manager 904 also enables the user to view the resulting target scene output image and/or request further edits to the scene using a user interface.

Inputs received by the user interface manager 904 include natural language descriptions of a target scene. Specifically, an input prompt may include 1) image operations, 2) a sentence with a grammatical structure that reflects composition and/or 3) objects and subjects.

Inputs may also include a source image or other baseline/foundation image. The source image may be a computer generated image, a frame of a video, a picture captured by a camera (or other sensor), and the like. In some embodiments, the user interface manager 904 may enable the user to download images from a local or remote storage location. For example, the user may provide an address such as a URL or other endpoint associated with the source image. In some embodiments, the user interface manager 904 can enable a user to link an image capture device such as a camera or other hardware to capture image data and provide it to the target scene generation system 900.

In some embodiments, the source image is a previously generated image (e.g., a target scene). Additionally or alternatively, the inputs may include a revision to a previous description of a scene. These inputs correlate to user revisions/modifications to a scene based on a displayed scene (e.g., an output).

As illustrated in FIG. 9, the target scene generation system 900 includes an input extractor 902. The input extractor 902 executes various modules to extract information from the input. In some embodiments, as described herein, the input extractor 902 can include modules such as a style analyzer, a fidelity analyzer, an image comparator, and the like. In some embodiments, the input extractor 902 is configured to identify and parse out control language and sub-prompts. The control language and sub-prompts are used to generate visual elements (e.g., objects in a target scene) in a target scene. Control language may include visual elements (referred to herein as control elements) such as borders (e.g., a frame), shapes (e.g., a circle), vignettes, effects (e.g., double exposure), and the like. Each control element (identified by control language in the prompt) may be defined by a specific set of parameters. Control language may also include target scene composition relationships. Sub-prompts include noun (s) corresponding to a subject/object of the input, and any associated properties (e.g., adjectives).

In some embodiments, any of the modules of the input extractor 902 (e.g., the control language identifier and/or the structural analyzer) are configured to derive groupings from the arrangement of the extracted information (e.g., control language and/or sub-prompts) and the grammatical structure of the prompt. The groupings may be translated into one or more image operations. The modules of the input extractor 902 may derive groupings using any suitable grouping technique (e.g., any natural language processing technique, any clustering technique, etc.). Using these groupings, a target scene is generated that preserves the structure of the prompt.

As illustrated in FIG. 9, the target scene generation system 900 includes an image orchestrator 910. The image orchestrator 910 maps information extracted from the input extractor 902 to one or more modules of the target scene generation system 900 (such as the generative AI module 906 hosted by the neural network manager 912, described below). The generative AI module 906 may be any generative AI module configured to generate an image using natural language prompt. In particular, the generative AI module 906 may receive a batch of sub-prompts, each sub-prompt of the batch of sub-prompts including information to generate a visual element corresponding to a subject/object of a target scene.

In response to providing sub-prompt information, control element information, and/or other extracted information to the modules of the target scene generation system 900, the image orchestrator 910 receives visual elements. Subsequently, the image orchestrator 910 buffers the generated visual elements and provides a set of generated visual elements to the image compiler 908.

The image compiler 908 arranges one or more received generated visual elements in a representation (e.g., a target scene) that the user can edit and further refine. The image compiler 908 is configured to perform one or more layering operations, image operations, and the like, to compose a target scene. The image compiler 908 leverages any identified control language by performing a specific composition operation associated with the control language.

As illustrated in FIG. 9, the target scene generation system 900 also includes a neural network manager 912. Neural network manager 912 may host a plurality of neural networks or other machine learning models, such as generative AI module 906. The neural network manager 912 may include an execution environment, libraries, and/or any other data needed to execute the machine learning models. In some embodiments, the neural network manager 912 may be associated with dedicated software and/or hardware resources to execute the machine learning models. As discussed, generative AI module 906 can be implemented as any type of generative AI. In various embodiments, each neural network hosted by neural network manager 912 may be the same type of neural network or may be different types of neural network, depending on implementation. Although depicted in FIG. 9 as being hosted by a single neural network manager 912, in various embodiments the neural networks may be hosted in multiple neural network managers and/or as part of different components. For example, generative AI module 906 can be hosted by its own neural network manager, or other host environment, in which the respective neural networks execute, or the generative AI module 906 may be spread across multiple neural network managers depending on, e.g., the resource requirements of the generative AI module 906, etc.

As illustrated in FIG. 9 the target scene generation system 900 also includes training manager 914. The training manager 914 can teach, guide, tune, and/or train one or more neural networks. In particular, the training manager 914 can train a neural network based on a plurality of training data. For example, the generative AI module may be trained to perform the reverse diffusion process. More specifically, the training manager 914 can access, identify, generate, create, and/or determine training inputs and utilize the training inputs to train and fine-tune a neural network.

As illustrated in FIG. 9, the target scene generation system 900 also includes the storage manager 922. The storage manager 922 maintains data for the target scene generation system 900. The storage manager 922 can maintain data of any type, size, or kind as necessary to perform the functions of the target scene generation system 900. The storage manager 922, as shown in FIG. 9, includes training data 918. Training data 918 includes manually labeled data for supervised learning. Training using supervised learning is part of the training performed during semi-supervised learning. The storage manager 922 also stores control language data 916. The control language data 916 includes a collection of control elements and corresponding parameters. The control language data 916 may be accessed by the control language identifier 910 when identifying control language in a prompt. Additionally or alternatively, the control language data 916 may be accessed by the control language identifier 910 to obtain the format of an identified control element. For example, a frame control element may include parameters such as a width (integer) and a higher (integer) and a description (string). In some embodiments, the control language data 916 also includes default parameter values.

Each of the components 902-914 of the target scene generation system 900 and their corresponding elements (as shown in FIG. 9) may be in communication with one another using any suitable communication technologies. It will be recognized that although components 902-914 and their corresponding elements are shown to be separate in FIG. 9, any of components 902-914 and their corresponding elements may be combined into fewer components, such as into a single facility or module, divided into more components, or configured into different components as may serve a particular embodiment.

The components 902-914 and their corresponding elements can comprise software, hardware, or both. For example, the components 902-914 and their corresponding elements can comprise one or more instructions stored on a computer-readable storage medium and executable by processors of one or more computing devices. When executed by the one or more processors, the computer-executable instructions of the target scene generation system 900 can cause a client device and/or a server device to perform the methods described herein. Alternatively, the components 902-914 and their corresponding elements can comprise hardware, such as a special purpose processing device to perform a certain function or group of functions. Additionally, the components 902-914 and their corresponding elements can comprise a combination of computer-executable instructions and hardware.

Furthermore, the components 902-914 of the target scene generation system 900 may, for example, be implemented as one or more stand-alone applications, as one or more modules of an application, as one or more plug-ins, as one or more library functions or functions that may be called by other applications, and/or as a cloud-computing model. Thus, the components 902-914 of the target scene generation system 900 may be implemented as a stand-alone application, such as a desktop or mobile application. Furthermore, the components 902-914 of the target scene generation system 900 may be implemented as one or more web-based applications hosted on a remote server. Alternatively, or additionally, the components 902-914 of the target scene generation system 900 may be implemented in a suite of mobile device applications or "apps."

As shown, the target scene generation system 900 can be implemented as a single system. In other embodiments, the target scene generation system 900 can be implemented across multiple systems. For example, one or more functions of the target scene generation system 900 can be performed by one or more servers, and one or more functions of the target scene generation system 900 can be performed by one or more client devices.

For example, upon the client device accessing a webpage or other web application hosted at the one or more servers, in one or more embodiments, the one or more servers can provide access to a user interface displayed at a client device prompting a user for an input of a scene to be generated (e.g., a description of a scene, a baseline image for a scene, etc.). The client device can provide the input to the one or more servers. Upon receiving the input of a scene to be generated, the one or more servers can automatically perform the methods and processes described above to extract a structure of the input and generate a composed target scene. The one or more servers can provide access to the user interface displayed at the client device with the target scene.

FIGS. 1-9, the corresponding text, and the examples, provide a number of different systems and devices that allows a user to compose a target scene using a natural language description. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The method described in relation to FIG. 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart 1000 of a series of acts in a method of composing a target scene using a natural language description in accordance with one or more embodiments. In one or more embodiments, the method 1000 is performed in a digital medium environment that includes the target scene generation system 900. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of receiving a natural language description of an image to be generated using a machine learning model. The natural langue description of the image may include 1) image operations, 2) a sentence with a grammatical structure that reflects composition and/or 3) objects and subjects of the scene. In some embodiments, a source image is also received. A desired composition (otherwise referred to as a target scene or a description of an image to be generated) is described using the prompt in a natural language format.

As illustrated in FIG. 10, the method 1000 includes an act 1004 of extracting, from the natural language description of the image to be generated, a control element and a sub-prompt. As described herein, one or more modules of an input extractor may extract information from the natural language description of the image to be generated. For example, a control language identifier of the input extractor parses out any control language in the natural language description of the image to be generated. Control language may refer to language describing control elements which are visual elements such as borders (e.g., frames), shapes (e.g., circles), vignettes, one or more effects (e.g., double exposure), and the like. Control language may also refer to language describing a composition of a scene. A structural analyzer of the input extractor parses out any sub-prompts in the natural language description of the image to be generated. In some embodiments, one or more features/characteristics of the sub-prompts are determined by identifying semantically related terms corresponding to sub-prompt. The semantically related features/characteristics of the sub-prompt are grouped with the sub-prompt to preserve a relationship between the features/characters of the sub-prompt and the sub-prompt.

As illustrated in FIG. 10, the method 1000 includes an act 1006 of identifying a relationship between the control element and the sub-prompt based on the natural language description of the image. For example, the control language identifier executes a natural language toolkit (NLTK) to identify grammatical relationships of the natural language description of the image to be generated. The identified grammatical relationships group related information. Similarly, the structural analyzer can derive groups of sub-prompts. For example, the structural analyzer leverages one more NLP algorithms to identify different parts of speech and their relationships in natural language description of the image to be generated. As described herein, each sub-prompt identified by the structural analyzer may include a noun of the subject/object of the input, and any associated properties (e.g., adjectives). By identifying sub-prompts including subjects, related objects, and related properties using part of speech tagging, the structural analyzer derives groupings from the grammatical structure of the natural language description of the image to be generated. The modules of the input extractor derive groupings between control language and sub-prompts, sub-prompts and other sub-prompts, semantically related features of a sub-prompt and sub-prompts, and the like. The groupings preserve the relationship of the objects in the group such that visual elements (corresponding to the objects of the group) are arranged according the group.

As illustrated in FIG. 10, the method 10000 includes an act 1008 of generating, by the machine learning model, the image based on the control element, the sub-prompt, and the relationship. The image includes visual elements corresponding to the control element and the sub-prompt. As described herein, a machine learning model such as a generative AI model receives sub-prompt information and control element information determined from the natural language description of the image to be generated. The generative AI module generates visual elements corresponding to the information extracted from the input (e.g., sub-prompts, control language, features of sub-prompts, etc.) The image described by the natural language description is generated by arranging the generated visual elements according to the relationship identified between the control element and the sub-prompt.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
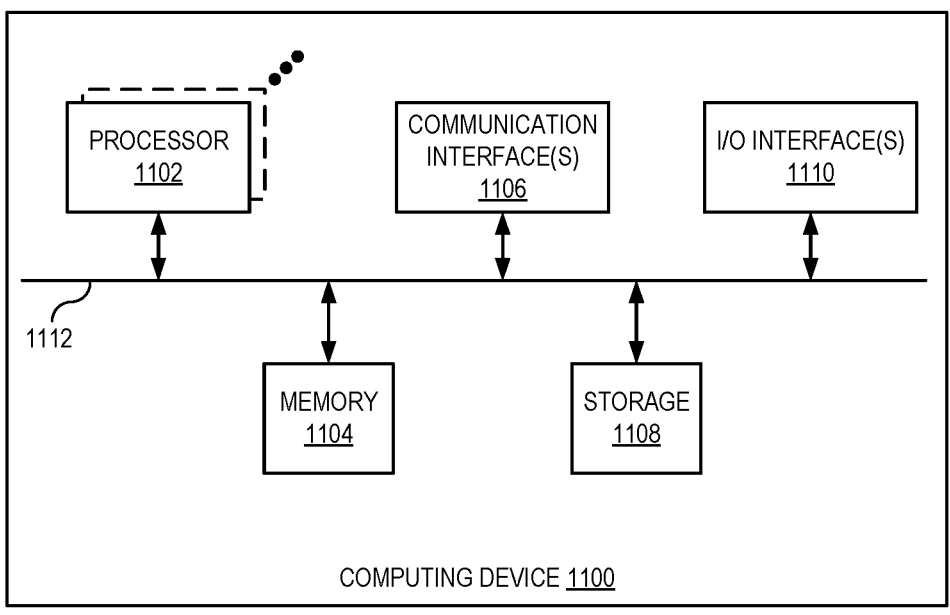
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the target scene generation system. As shown by FIG. 11, the computing device can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving a natural language description of an image to be generated using a machine learning model;
   extracting, from a first portion of the natural language description of the image to be generated, a control element from a plurality of control elements, wherein the control element is associated with a set of parameters, and wherein each control element of the plurality of control elements is associated with a different set of parameters;
   extracting, from a second portion of the natural language description of the image to be generated, a sub-prompt, wherein the sub-prompt defines a visual element of visual elements of the image to be generated, and wherein the second portion of the natural language description comprises natural language text different from the natural language text of the first portion of the natural language description of the image;
   identifying a relationship between the control element and the sub-prompt based on the natural language description of the image to be generated; and
   generating, by the machine learning model, an image based on the control element, the sub-prompt, and the relationship, wherein the image includes visual elements corresponding to the control element and the sub-prompt.

2. The method of claim 1, wherein the set of parameters defines a first visual element of the image, and the sub-prompt defines a second visual element of the image.

3. The method of claim 2, wherein generating, by the machine learning model, the image based on the control element, the sub-prompt, and the relationship further comprises:
   generating the first visual element and the second visual element using the machine learning model;
   performing an operation on the first visual element based on the set of parameters; and
   arranging the image using the first visual element and the second visual element.

4. The method of claim 3, wherein performing the operation includes cutting the first visual element according to the set of parameters.

5. The method of claim 3, wherein arranging the image comprises:
   applying the first visual element to the second visual element.

6. The method of claim 2, wherein the set of parameters includes one or more of a height parameter, a width parameter, a radial x-value, a radial y-value, or a description.

7. The method of claim 2, further comprising:

determining a semantically related term using the sub-prompt, wherein the semantically related term defines a third visual element;

generating the third visual element using the machine learning model; and arranging the image using the first visual element, the second visual element, and the third visual element.

8. The method of claim 7, further comprising:

grouping the second visual element and the third visual element to preserve a relationship between the second visual element and the third visual element.

9. The method of claim 1, wherein the relationship between the control element and the sub-prompt is a grammatical relationship grouping the control element and the sub-prompt.

10. The method of claim 1, further comprising:

receiving a source image; and generating, by the machine learning model, the image based on the source image, the control element, the sub-prompt, and the relationship, wherein the image includes visual elements corresponding to the control element and the sub-prompt.

11. A system comprising:

a memory component; and a processing device coupled to the memory component, the processing device to perform operations comprising:

receiving a natural language description of an image to be generated using a machine learning model;

extracting, from a first portion of the natural language description of the image to be generated, a control element from a plurality of control elements, wherein the control element is associated with a set of parameters, and wherein each control element of the plurality of control elements is associated with a different set of parameters;

extracting, from a second portion of the natural language description of the image to be generated, a sub-prompt, wherein the sub-prompt defines a visual element of visual elements of the image to be generated, and wherein the second portion of the natural language description comprises natural language text different from the natural language text of the first portion of the natural language description of the image;

identifying a relationship between the control element and the sub-prompt based on the natural language description of the image to be generated; and generating, by the machine learning model, an image based on the control element, the sub-prompt, and the relationship, wherein the image includes visual elements corresponding to the control element and the sub-prompt.

12. The system of claim 11, wherein the set of parameters defines a first visual element of the image, and the sub-prompt defines a second visual element of the image.

13. The system of claim 12, wherein generating, by the machine learning model, the image based on the control element, the sub-prompt, and the relationship further comprises:

generating the first visual element and the second visual element using the machine learning model;

performing an operation on the first visual element based on the set of parameters; and arranging the image using the first visual element and the second visual element.

14. The system of claim 11, wherein the relationship between the control element and the sub-prompt is a grammatical relationship grouping the control element and the sub-prompt.

15. A non-transitory computer-readable medium storing executable instructions, which when executed by a processing device, cause the processing device to perform operations comprising:

receiving a natural language description of an image and a source image;

extracting, from a first portion of the natural language description of the image, a control element from a plurality of control elements, wherein the control element is associated with a set of parameters, and wherein each control element of the plurality of control elements is associated with a different set of parameters;

extracting, from a second portion of the natural language description of the image, a sub-prompt, wherein the sub-prompt defines a visual element, and wherein the second portion of the natural language description comprises natural language text different from the natural language text of the first portion of the natural language description of the image;

generating the visual element using a generative model, wherein the visual element is based on the sub-prompt; and arranging an image using the visual element and the source image.

16. The non-transitory computer-readable medium of claim 15, wherein arranging the image comprises:

performing a composition operation based on the source image and the visual element.

17. The non-transitory computer-readable medium of claim 15, storing executable instructions that further cause the processing device to perform operations comprising:

receiving a revision to at least one of the visual element or the source image.

18. The non-transitory computer-readable medium of claim 17, wherein the revision is at least one of a size revision, a color revision, or a position revision.

19. The non-transitory computer-readable medium of claim 15, further comprising: generating another visual element defined by the set of parameters using the generative model.

20. The non-transitory computer-readable medium of claim 15, storing executable instructions that further cause the processing device to perform operations comprising:

output the image for display to a user.

* * * * *